United States Patent [19]
Zobel

[11] Patent Number: 4,858,002
[45] Date of Patent: Aug. 15, 1989

[54] WIDE-ANGLE OBJECTIVE FOR ENDOSCOPES

[75] Inventor: Jürgen Zobel, Bretten-Sprantal, Fed. Rep. of Germany

[73] Assignee: Richard Wolf GmbH, Fed. Rep. of Germany

[21] Appl. No.: 179,870

[22] Filed: Apr. 11, 1988

[30] Foreign Application Priority Data

Apr. 11, 1987 [DE] Fed. Rep. of Germany ....... 3712453

[51] Int. Cl.⁴ .............................................. A61D 1/04
[52] U.S. Cl. ...................................... 358/98; 358/225; 350/480; 350/414
[58] Field of Search ................. 358/209, 225, 98, 109, 358/111; 128/4

[56] References Cited

U.S. PATENT DOCUMENTS 3,166,623  1/1965  Waidelich, Jr. ..................... 358/98
4,720,178  1/1988  Nishioka et al. ..................... 128/4
4,746,975  12/1986 Ogiu ..................................... 128/4

*Primary Examiner*—Jin F. Ng
*Assistant Examiner*—Mehdi Haghani
*Attorney, Agent, or Firm*—Hill, Van Santen, Steadman & Simpson

[57] ABSTRACT

A wide-angle objective for endoscopes, in particular for video endoscopes comprises fibre image conductors or CCD image transducers, in which known instruments are taken as a basis, in which a distally positioned objective comprises a meniscus lens with its concave surface facing towards the object, as well as another optical component located on the image side. To secure an uncomplicated structure, adequate image quality, a wide object field angle and short structural length, the image-side optical component is also produced as a meniscus lens.

6 Claims, 1 Drawing Sheet

WIDE-ANGLE OBJECTIVE FOR ENDOSCOPES

BACKGROUND OF THE INVENTION

1. Field of the Invention

This invention relates to a wide-angle objective for endoscopes, in particular for video endoscopes having a semiconductor image transducer and for endoscopes having a fibre image conductor, the wide angle objective being of the kind including a meniscus located at the distal and object side with its concave surface facing towards the object, another structural optical component located at the image side, and a diaphragm possibly associated with the optical system.

2. Description of the Prior Art

Objectives of this kind are required to have a short structural length, with a small diameter, but in the endoscope optical systems hitherto known to the applicant, this cannot be accomplished without difficulty or only by a commensurate degree of complexity, if a large image or object field angle and satisfactory correction of the optical system are to be obtained.

Furthermore, there are specific limits for the structural length since minimum values apply to the central thicknesses, the marginal thicknesses as well as to the vertex spacings of the lenses, so that the structural length of the objectives cannot be reduced at will.

If, for example, the objective comprises two achromatic lenses, it is impossible to obtain perfect correction of the image field curvature since the negative refractive capacities needed for this purpose are missing from the optical system as a whole.

The result is that there is considerable attenuation of the definition in the marginal portion. For this reason, optical systems of this kind are commonly applicable only if the required object field angle amounts to at the most 60°, unless one is prepared to be involved in the high cost of limiting the image defects by the use of marginal vignetting.

Now, in the known flexible video endoscopes having an image transducer in the form of a chip, the rigid, distal end portion extends distally beyond the structural length of the objective because of the image transducer, the electronic system and the like. Furthermore, the distal end of the fibre cord of flexible endoscopes having a fibre image conductor is rigidly bonded into a metal sleeve which adds to the structural length of the objective. Thus, it will be appreciated with such endoscopes that the rigid, distal end portions of the endoscopes should be as short as possible and that the shortness of the objective is of decisive importance.

SUMMARY OF THE INVENTION

Accordingly, the main object of the present invention is to provide a wide-angle objective for endoscopes, which allows for a small structural length, whilst retaining an uncomplicated structure, adequate correction and wide object field angle.

To this end, the present invention consists in a wide-angle objective for an endoscope which objective has a distal and object side and an image side, a meniscus located on the distal and object side with its concave surface to face towards an object, another optical component located on the image side, and a diaphragm located distally of the meniscus, characterized in that the image-side component is also constructed as a meniscus, and in that the two menisci are governed by the following relationships:

$$\alpha > 85°; n_d > 1.7; Vd > 40; \infty > |r1| > |r2|;$$

$$|r3| < |r4| \leq \infty; 2F < f1 < 3F; f2 > \frac{F \cdot f1}{f1 - F}$$

having the following significance:
- alpha = object field angle
- $n_d$ = calculation factor or index of refraction for light of the wavelength d
- Vd = Abbe number for the wavelength d
- d = 580 nm
- r1 = object-side radius of the distal meniscus
- r2 = image-side radius of the distal meniscus
- r3 = object-side radius of the proximal meniscus
- r4 = image-side radius of the proximal meniscus
- F = overall focal length of the objective
- f1 = focal length of the distal meniscus
- f2 = focal length of the proximal meniscus are applicable for both meniscus lenses (2; 5,7).

Particularly advantageous dimensions result for an objective in a preferred embodiment if the relationship L<2D is made the basis for the objective structure regarding the structural length L of the objective and the diameter D taken diagonally through the sensor surface of the image transducer or through the ingress surface of the fibre image conductor.

By virtue of the invention an endoscope provided with such an objective at the distal side has by virtue of its small size the advantages in particular of universal applicability.

BRIEF DESCRIPTION OF THE DRAWINGS

In order that the invention may be more readily understood, some embodiments thereof will now be described, by way of example, with reference to the accompanying drawings, in which.

DESCRIPTION OF THE PREFERRED EMBODIMENTS

Figure 1:
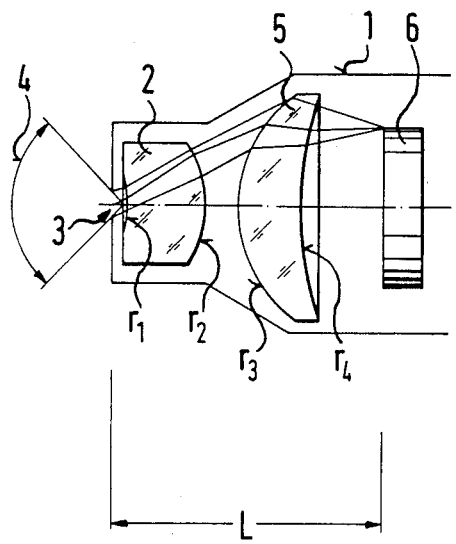
FIG. 1 is a diagrammatic side elevation of a wide-angle objective for a video endoscope and having two meniscus lenses which project the image on to an electronic image transducer.

Referring to FIG. 1, the optical system forming an objective is mounted in a tubular sleeve 1, which is only partially illustrated for reasons of clarity, at the distal end of the flexible tube of a video endoscope of conventional structure, which tube is not shown since it does not form part of this invention. The objective comprises a first distal meniscus lens 2 with its concave surface facing the object, a diaphragm 3 located distally of the meniscus lens 2 in such manner that an object or field of view angle 4 of $\alpha \sim 100°$ is kept open. The object-side radius of curvature r1 of the first meniscus lens 2 is 2.5 cms, and the image-side radius r2 has the dimension of 1.7 cms in the example of the embodiment of FIG. 1.

The first meniscus lens 2 is followed by a second meniscus lens 5, in such manner that its convex surface faces towards the first meniscus 2 and the concave surface consequently forms the image side. The objective side of this second meniscus 5 has a radius of curvature r3=2.3 cms and the image side has such a radius r4=6.5 cms. The image generated by this lens system is projected on to a CCD element 6 acting as an image transducer which in a known manner transforms the image of the object into electronic signals, which are transmitted to a reception system via an electric conductor present in the flexible tube of the endoscope.

Figure 2:
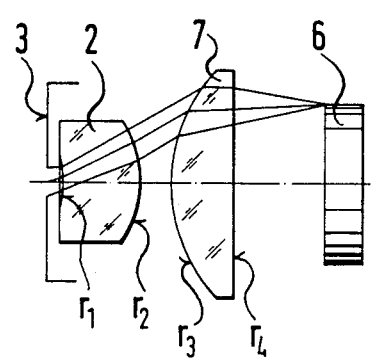
FIG. 2 is a diagrammatic view of an arrangement according to FIG. 1 with a proximally located special lens of plano-convex shape.

FIG. 2 shows an alternative embodiment of the objective which also has the above-mentioned parameters and in which the first meniscus 2 has the radius of curvature r1=2.5 cms at the object side, and r2=1.4 cms at the image side, whereas the second meniscus 7 has a special feature inasmuch as its object-side radius of curvature r3=2.75 cms and the image side radius r4=infinity, meaning that this surface is a plane.

Figure 3:
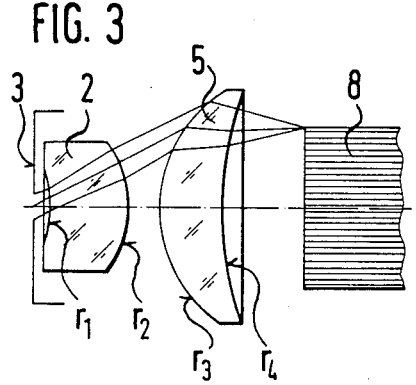
FIG. 3 is a diagrammatic side elevation of a wide-angle objective for an endoscope having a fibre image conductor and having two meniscus lenses which project the image onto the fibre image conductor.

FIG. 3 illustrates the objective of an endoscope provided with a fibre image conductor, in which the meniscus lenses 2 and 5 are modified regarding their radii of curvature in adaptation to the circular cross-section of the fibre image conductor cord 8. The object-side radius of curvature r1 of the first meniscus 2 is thus equal to 2.25 cms, its image side radius r2 being retained as 1.7 cms and the object-side radius of the second meniscus 5, that is r3 being retained as 2.3 cms according to the embodiment of FIG. 1, and the image-side radius of curvature r4 of the second meniscus is produced with the dimension 5.75 cms.

Figure 4:
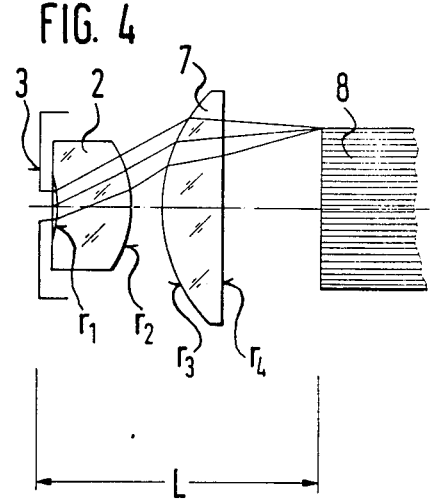
FIG. 4 is a diagrammatic view of an arrangement according to FIG. 3 with a proximally located special lens of plano-convex shape.

In a similar manner to that of the illustration according to FIG. 2, FIG. 4 finally shows the objective of a fibre image conductor endoscope in which the first meniscus 2 is produced at the object side with a radius of curvature r1=2.25 and at the image side with a radius r2=1.83 cms, whereas the second meniscus 7 again has a plane image-side surface, that is to say a surface having a radius of curvature r4=infinity, and with a radius r3=2.72 cms at the object side.

The following values are obtained by calculation for the four objectives illustrated in consideration of the data and relationships referred to in the foregoing, if α=100° is taken as a basis.

If Vd=46.5 and nd=1.8 are selected for the two meniscus lenses in the case of the objectives according to FIGS. 1 and 2 for example, this yields the relationships 3.6=2F<f1<3.81<3F=5.4 and f2=3.99>F.f1/f1-F=3.41 for the objective according to FIG. 1, as well as the relationships 3.6=2F<f1=4.35<3F=5.4 and f2=3.41>F.f1/f1-F=3.07 for the objective according to FIG. 2.

The values Vd=41 and nd=1.88 for example are applicable in each case for the distal meniscus and the values Vd=50 and nd=1.79 apply in each case to the proximal meniscus, in the case of the objectives according to FIGS. 3 and 4. This leads to the relationships 3.6=2F<f1=3.72<3F=5.4 and fe=4.29>F.f1/f1-F=3.41 for the objective according to FIG. 3, and the relationships 3.6=2F<f1=4.51<3F=5.4 and f2=3.43>F.f1/f1-F=2.99, for the objective according to FIG. 4.

Whilst particular embodiments have been described, it will be appreciated that the invention includes all modifications and variations falling within its scope.

What is claimed is:

1. A wide-angle objective for an endoscope, said objective having a distal side facing an object and an image side, a meniscus being located at the distal side with a concave first surface facing towards the object, another optical component being of the meniscus, the improvements comprising said meniscus being a distal meniscus with said first surface having a first radius r1, said distal meniscus having a second surface with a second radius r2 facing toward said another optical component, said another optical component being a proximal meniscus having a first surface with a radius r3 facing toward the distal meniscus and a second surface with a radius r4 facing towards said image side of the objective, said objective having a field of view angle α and an overall focal length of F, said distal meniscus having a focal length of f1 and said proximal meniscus having a focal length f2, and the proximal and distal menisci having the following dimensions:

$$\alpha > 85°$$
$$nd > 1.7$$
$$Vd > 40$$
$$\infty > |r1| > |r2|$$
$$|r3| < |r4| \leq \infty$$
$$2F < f1 < 3F$$
$$f2 > \frac{F \cdot f1}{f1 - F}$$

wherein nd is an index of refraction for a wavelength of 580 nm; and Vd is an abbe coefficient for a wavelength of 580 nm.

2. A wide-angle objective according to claim 1, wherein the second radius r4 of the proximal meniscus is infinity so that the proximal meniscus is a plano-convex lens.

3. A wide-angle objective according to claim 1, wherein said objective has a structural length L, said endoscope being a video endoscope with a semiconductor image transducer having a sensor surface with a diagonal dimension D along the sensor surface, said length L and diagonal dimension D having a relationship of L<2D.

4. A wide-angle objective according to claim 3, wherein the second radius r4 of the proximal meniscus infinity so that the proximal meniscus is a plano-convex lens.

5. A wide-angle objective according to claim 1, wherein said objective has a structural length L, said endoscope having a fiber image conductor with an image entry surface with a diameter D, said length L and diameter D having a relationship of L<2D.

6. A wide-angle objective according to claim 5, wherein the second radius r4 of the proximal meniscus is infinity so that the proximal meniscus is a plano-convex lens.

* * * * *